US009078228B2

(12) United States Patent
Flanagan

(10) Patent No.: US 9,078,228 B2
(45) Date of Patent: Jul. 7, 2015

(54) MOBILE GEOLOCATION

(75) Inventor: Michael Joseph Flanagan, Chester, NJ (US)

(73) Assignee: JDSU UK Limited, Hampshire (GB)

( * ) Notice: Subject to any disclaimer, the term of this patent is extended or adjusted under 35 U.S.C. 154(b) by 52 days.

(21) Appl. No.: 13/369,591

(22) Filed: Feb. 9, 2012

(65) Prior Publication Data
US 2013/0210449 A1      Aug. 15, 2013

(51) Int. Cl.
H04W 24/00       (2009.01)
H04W 64/00       (2009.01)
G01S 5/02        (2010.01)

(52) U.S. Cl.
CPC ............. *H04W 64/00* (2013.01); *G01S 5/0252* (2013.01)

(58) Field of Classification Search
CPC ............................. H04W 64/00; G01S 5/0252
USPC ...................................................... 455/456.1
See application file for complete search history.

(56) References Cited

U.S. PATENT DOCUMENTS

| 7,346,359 | B2 * | 3/2008 | Damarla et al. | 455/456.1 |
| 2005/0037776 | A1 * | 2/2005 | Perez-Breva et al. | 455/456.1 |
| 2005/0208952 | A1 * | 9/2005 | Dietrich et al. | 455/456.1 |
| 2008/0133126 | A1 | 6/2008 | Dupray | |
| 2010/0311436 | A1 * | 12/2010 | Bevan et al. | 455/456.1 |
| 2013/0095848 | A1 * | 4/2013 | Gold et al. | 455/456.1 |

FOREIGN PATENT DOCUMENTS

| WO | 01/72060 A1 | 9/2001 |
| WO | 2007017691 A1 | 2/2007 |
| WO | 2010083943 A1 | 7/2010 |

OTHER PUBLICATIONS

Muhammed Fuzail Khan, "Mobile Cellular Location Positioning: An Approach Combining Radio Signal Strength Propagation and Trilateration", Nov. 2009, 1 page.
Ding-Bing Lin, Rong-Terng Juang, "Mobile Location Estimation Based on Differences of Signal Attenuations for GSM Systems", Manuscript, Jul. 2005, 8 pages.
Bo-Chieh Liu, Kaohsiung Ken-Huang Lin, "Cellular Geolocation Employing Hybrid of Relative Signal Strength Propagation Delay", Publication, Apr. 2006, 2 pages.
PCT International Search Report and The Written Opinion of counterpart PCT Application PCT/EP2013/052416 issued by the International Searching Authority dated Jun. 5, 2013.

* cited by examiner

*Primary Examiner* — Charles Shedrick
(74) *Attorney, Agent, or Firm* — JDS Uniphase Corporation

(57) ABSTRACT

Estimating a location of a first mobile communication unit (220) in a cellular wireless communications system (200) comprises comparing a first signature from the first mobile communication unit with known signatures. The first signature may comprise control information, a set of observable cells and received power level information for the first mobile communication unit (220). A location estimate is provided from the known location of a known signature in a database (410), if that known signature matches the first signature. The comparison may be a correlation to determine the degree of matching. Context information may link two or more known signatures in the database (410), the known signatures having been obtained in temporal succession from one mobile device (258) in use in the system. The context information may be used in the comparison.

25 Claims, 7 Drawing Sheets

MOBILE GEOLOCATION

FIELD OF THE INVENTION

The field of the invention relates to a system and method for geolocating mobile communication units, in a mobile communications system.

BACKGROUND OF THE INVENTION

Wireless communication systems, such as GSM and the $3^{rd}$ Generation (3G) of mobile telephone standards and technology, are well known. An example of 3G standards and technology is the Universal Mobile Telecommunications System (UMTS™), developed by the $3^{rd}$ Generation Partnership Project (3GPP™) (www.3gpp.org).

The $3^{rd}$ and $4^{th}$ generations of wireless communications, and in particular systems such as LTE, have generally been developed to support macro-cell mobile phone communications. Here the 'phone' may be a smart phone, or another mobile or portable communication unit that is linked wirelessly to a network through which calls are connected. Henceforth all these devices will be referred to as mobile communication units. 'Calls' may be data, video, or voice calls, or a combination of these. An increasing proportion of communications involve data rather than voice, and are technically referred to as being a 'connection', rather than a 'call'.

Macro cells utilise high power base stations to communicate with wireless communication units within a relatively large geographical coverage area. The coverage area may be several square kilometers, or larger if it is not in a built-up area.

Typically, mobile communication units communicate with each other and other telephone systems through a network. In a 3G system, this is the 'Core Network' of the 3G wireless communication system, and the communication is via a Radio Network Subsystem. A wireless communication system typically comprises a plurality of Radio Network Subsystems. Each Radio Network Subsystem comprises one or more cells, to which mobile communication units may attach, and thereby connect to the network. A base station may serve a cell with multiple antennas, each of which serves one sector of the cell. Often a cellular wireless communication system is described as comprising two parts: the network; and the mobile communication units.

FIG. 1 provides a perspective view of one prior art wireless communication system 100. The system of FIG. 1 comprises a network of base stations BS1-BS8. Only one mobile communication unit 110 is shown. In a real network, there may be anywhere from thousands to millions of mobile communication units.

A base station such as 120 communicates with mobile communication unit 110. Base station 120 allows mobile communication unit 110 to place calls through the network, and receive calls routed through the network to base station 120.

Base station 130 has been shown as having a coverage area 132. If base station 130 had an omnidirectional antenna, and the terrain were flat, then coverage area 132 might be circular. However, both the shape and extent of the coverage areas of a typical base station depend on many variables, and may change with time.

Controller 140 manages calls within the wireless communication system 100. Controller 140 would be linked to all the base stations BS1-BS8, but the links are not shown in order to keep FIG. 1 simple to interpret. Controller 140 may process and store call information from the base stations, plus many other base stations not shown in FIG. 1. In a UMTS network, controller 140 may be linked to the base stations via one or more Radio Network Subsystems.

There may be significant advantage in knowing where a mobile communication unit 110 is located in wireless communication system 100. Prior art wireless communication systems have provided a variety of solutions to the problem of 'geolocating' mobile communication unit 110. One known solution involves providing specific equipment within the mobile communication unit that can measure location, such as a GPS unit. However, many users switch off the GPS function on their mobile communication units. Partly as a consequence, reported GPS details are highly infrequent. As little as one call in ten-thousand might report a GPS coordinate.

One prior art solution indicates that absolute power transmission levels can be used to geo-locate the mobile station. See for example "*Mobile Cellular Location Positioning: An Approach Combining Radio Signal Strength Propagation and Trilateration*", M. F. Khan, Masters Thesis, University of Johannesburg, November 2009. However, power measurements in event-driven technologies, such as LTE, can be relatively infrequent. Even where a system or mobile communication unit has the capability of performing geolocation based on absolute power measurement, it may remain very important to make use of whatever alternate sources of information are also available.

Co-pending U.S. patent application Ser. No. 13,311,132, with applicant reference OPT004P326, was filed by the inventor of the present application. U.S. patent application Ser. No. 13,311,132 indicates that differential power levels can be used to geo-locate a mobile unit. A mobile communication unit provides a measurement of the difference in signal strengths that it receives from at least two base stations. The difference value can be compared to one or more contours of constant power difference, for signals received by subscriber mobile communication units in the system. An estimate of location can be obtained from this comparison. However, differential power techniques can be limited in scenarios where there are few pilots to make use of.

Other known wireless communication systems include:

(i) '*Mobile Location Estimation Based on Differences of Signal Attenuation for GSM Systems*', Lin and Juang, IEEE Trans, on Vehicular Technology, July 2005. This paper is available at: http://www.cce.ntut.edu.tw/ezfiles/0/academic/43/academic__46991__5867233__59222.pdf
This publication uses measurements of the differences between signal strengths, received by a mobile communications unit. The signals considered are from omni-directional antenna. Parameters of the network are derived from a model called the "Cost-Hata" model.

(ii) '*Cellular Geolocation Employing Hybrid of Relative Signal Strength and Propagation Delay*', Liu and Lin, WCNC 2006 Proceedings.
This publication uses measurements of the differences between signal strengths, received by a mobile communications unit, and a measure of "Propagation Delay" for signals. The propagation model parameters are from the "Okumura-Hata" model. This publication uses a method of location estimation that assumes omni-directional antennae.

(iii) Patent application WO2010/083943A shows a further technique, which uses signal strength and timing data derived from the mobile communication unit itself, along with network configuration data provided by the network operator, to locate the mobile communication unit.

In conventional wireless communication systems, there is wide variation in the power levels of signals received from base stations. The variations depend on many issues, including location of the wireless communication unit and time. Conventional wireless communication systems also employ "Timing Advance". This is a deliberate offset, introduced into communication signals. Timing advance is used to allow better synchronisation of received signals by various different mobile communication units, located at different distances from a base station. Hence timing advance generally varies as a function of distance from the transmitter. In a typical implementation, timing advance may be controlled for users who are further away from the transmitter. This feature should be available in LTE, but the reporting of it may not be activated in all deployed systems. However, a measure of timing advance is available from measurements made by the mobile communication unit, in some cellular wireless communication systems.

Known cellular wireless communication systems have faced the disadvantages that:

a) Received power levels at a receiver vary as a function of location within a network. Generally, the exact calculation of received power as a function of distance is not possible. This due to factors whose magnitude is unknown a priori. Examples of such factors are the rate at which the power level attenuates with distance, and the attenuation of power at a reference distance. Additional attenuation may arise as a consequence of the mobile communication unit being in-car or in-building. More than half of all calls are made within buildings or vehicles.

b) Timing Advance is not a direct measure of distance. Its use is primarily for synchronisation of communication channels. As such its value depends not only on distance, but also on various effects such as multi-path fading, hardware timing delays and such like. Hardware timing delays may be in the base station, or in a repeater in the cable from the antenna. If so, they are usually inaccessible, and hence may only be known to the infrastructure operator. However, some equipment allows the delays to be programmable, and hence both controllable and known. Timing advance is a coarse measure, each unit of timing advance corresponding to a distance of ~553 meters in GSM. Timing advance is however more precise in LTE, due to the higher symbol rate. It may be less than 100 meters in LTE.

c) Power measurements in event-driven technologies such as LTE can be relatively infrequent. This has caused prior art approaches often to focus on making use of alternate sources of information.

d) Other control information (peak burst rate, dynamic rate control information, timing advance information) can vary as a function of location within the network.

e) The set of observed cells varies as a function of location within the network.

f) GPS information is only provided infrequently by mobile stations, even with the proliferation of GPS chipsets in mobile devices. As little as one call in ten-thousand might report a GPS coordinate.

As a result, geo-location is often done in a "piece-meal" manner. That means on an event-by-event basis, often in isolation.

Hence, there is a need for an improved method for estimating the location of a mobile station communicating with a cellular network, such as an LTE, GSM or UMTS network.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Figure 1:
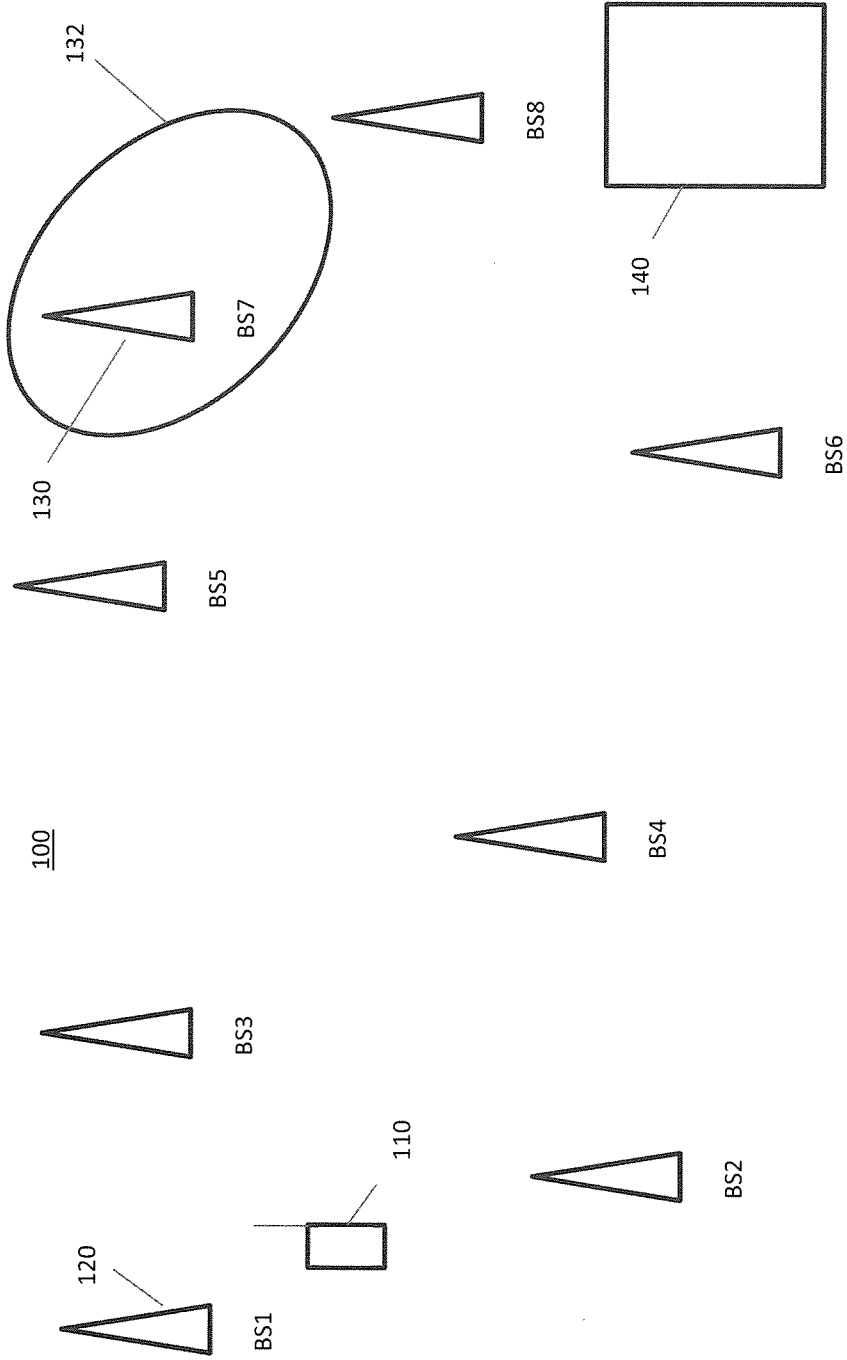
FIG. 1 is a schematic diagram, illustrating a prior art cellular wireless communication system.

A cellular wireless communications system is provided. The cellular wireless communication system may, for example, operate in accordance with the GSM, UMTS or LTE standards. The cellular wireless communications system comprises network nodes and mobile communication units. Each network node supports communications with mobile communication units in cell.

A method of estimating a location of a mobile communication unit in the cellular wireless communications system comprises compiling a first signature, for signals received by a mobile communication unit at a first point in time. The first signature comprises: control information; a set of cells, the set of cells being cells observable by the mobile communication unit; and received power level information, for signals received from the observable cells. A particular known signature is then selected from known signatures entered in a database, by comparing the first signature with known signatures entered in a database. The known signatures comprise location information. The location of the mobile communication unit at the first point in time can then be estimated, the estimate being based on location information of the known signature. The known signature may be selected at least partly on the basis of context information, the context information linking the known signature to a location and/or timing of one or more other known signatures in the database, which were obtained from one mobile communication unit.

The cellular wireless communications system may therefore provide a method of geo-locating, which makes use of control information as part of the geo-location process, rather than only using power levels. The geolocation may be based on known signals, which themselves include the broad context of a large proportion of the available signalling information from mobile communication units in the system. That information may be accumulated over time.

A method of estimating a location of a mobile communication unit in the cellular wireless communications system may comprise receiving a first signature from a first mobile communication unit in the cellular wireless communications system, the first signature comprising information about signals received by the first mobile communication unit from one or more base stations of the cellular wireless communications system. The signature can be used to select at least two known signatures from a database, each of the at least two known signatures having been obtained successively from a second mobile communication unit operating in the cellular wireless communications system. A location of the first mobile communication unit can be estimated as the known location of one of the at least two known signatures.

A method of populating a database of mobile communication unit reference signatures for geo-locating a mobile communication unit in a cellular wireless communications system may comprise receiving a sequence of two or more signatures from a mobile communication unit during commercial operation in the cellular wireless communications system. Each signature may comprise measurement information, and a measured location of the mobile communication unit at a timepoint when the signature was obtained. The method may comprise adding the sequence of two or more signatures as reference signatures to the database of mobile communication unit reference signatures. The database also stores the order in which the two or more signatures were obtained, and an indication that the two or more signatures were obtained from the same mobile communication unit.

Figure 2:
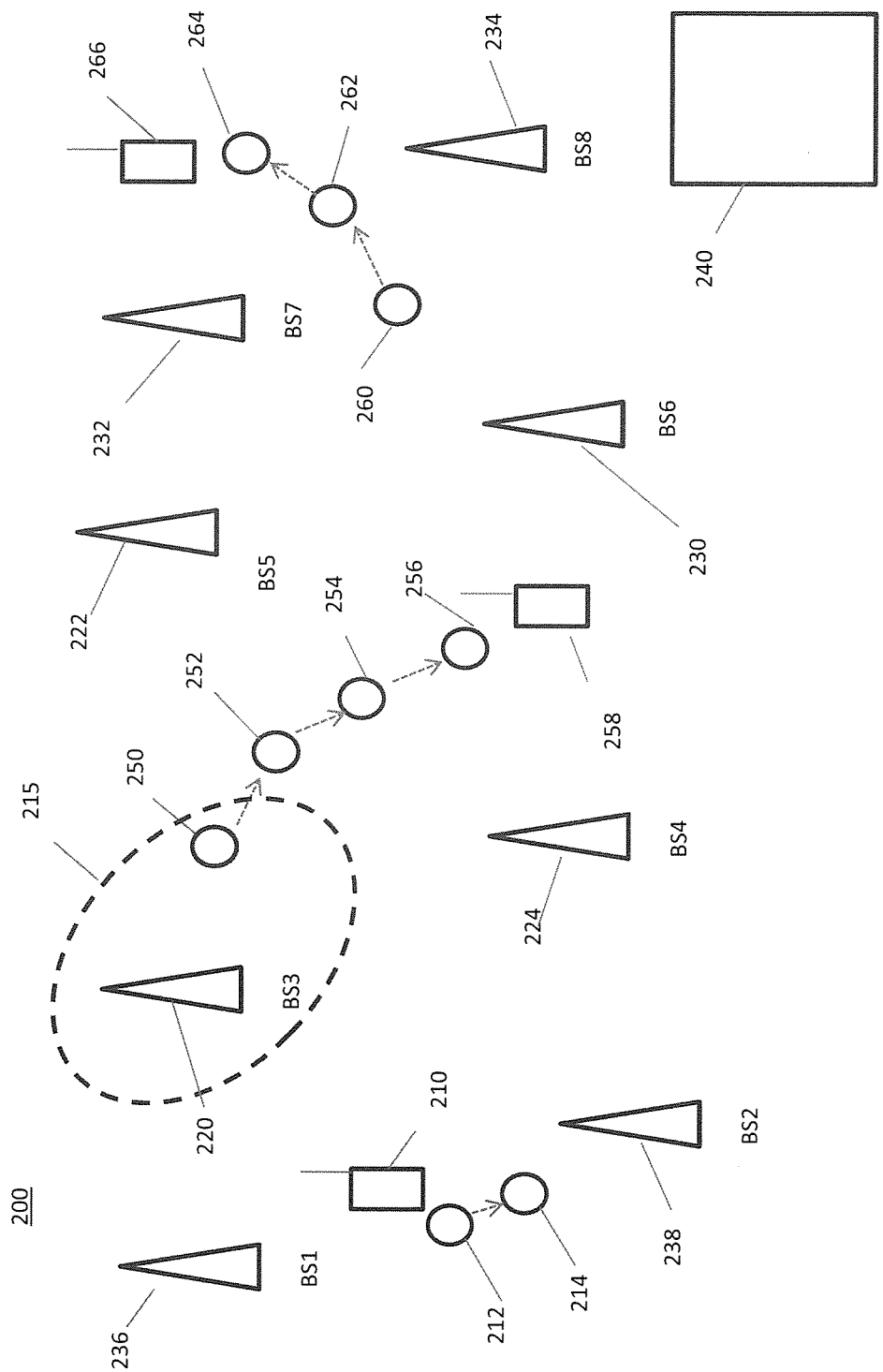
FIG. 2 is a schematic diagram, illustrating a cellular wireless communication system in accordance with an embodiment of the invention.

FIG. 2 illustrates a cellular wireless communication system 200. Mobile communication unit 210 is at a location 212 within cellular wireless communication system 200. However, the location 212 of mobile communication unit 210 is initially unknown. A second location 214 is also shown for mobile communication unit 210. Mobile communication unit 210 may occupy second location 214 at a timepoint following the time at which mobile communication unit 210 occupies location 212.

Base stations 220, 222, 224, 230, 232, 234, 236 and 238 are linked to controller 240. Each of base stations 220-238 provides communication from and to mobile communication units within a cell, in which the base station is located. The cells may be of the general form described with reference to cell 132 in FIG. 1. Cell 215 has been shown in FIG. 2 as a broken line around base station 220, as an illustrative example.

Locations 250, 252, 254 and 256 on FIG. 2 indicate consecutive positions occupied by a mobile communication unit 258. Locations 260, 262 and 264 indicate consecutive positions occupied by a mobile communication unit 266. At each location, mobile communication units 258 and 268 will receive signals from base stations in the network.

At locations 250, 252, 254 and 256, mobile communication unit 258 may receive communications from base stations 220, 222 and 224, and from other base stations. Base station 230 may be within range, for example, at location 256. At locations 260, 262 and 264, mobile communication unit 258 may receive communications from base stations 230, 232 and 234, and from other base stations.

The location 212 of mobile communication unit 210 can be estimated, from information such as that obtainable from the locations that other mobile communication units have occupied. At each of locations 250, 252, 254 and 256, mobile communication unit 258 provides a 'signature'. Each signature may be provided with a timestamp. The signature comprises at least, for that location and point in time:
(i) Control information. The control information will typically comprise one or more of timing advance, burst throughput rate, dynamic rate control and signal-to-noise ratio. If included, the dynamic rate control information would comprise at least channel quality indicators.
(ii) A set of cells, that are observable by the mobile communication unit 258. Cells such as at least cells 220, 222 and 224 may be observable from location 250.
(iii) Received power level information, for signals received from the observable cells.

Similarly, at each of locations 260, 262 and 264, mobile communication unit 266 provides a 'signature', each signature being provided with a timestamp. That signature comprises at least, for that location and point in time:
(i) Control information.
(ii) A set of cells, that are observable by the mobile communication unit 258. Cells, such as at least cells 230, 232 and 234 may be observable from point 260.
(iii) Received power level information, for signals received from the observable cells.

Mobile communication units 258 and 266 can also provide location information, for each of the locations for which they provide signatures. The signatures from locations 250, 252, 254, 256, 260, 262 and 264 can be stored in a database, as 'known' signatures. Each signature can be stored together with the location information and a timestamp. In a cellular wireless communication system 200, such known signatures may be obtained for many thousands of calls. This is possible, due to the very large number of calls made. These thousands of signatures will be available, even if as few as one in ten thousand calls provides a position estimate, such as a GPS measurement of the location of a mobile communication unit 258 and 266.

At location 212, mobile communication unit 210 can provide a signature at a first point in time, even though it does not provide a location measurement. It may not provide a location measurement for one of a variety of reasons, including that it has no position location equipment, or the position location function is switched off. However, the signature can be compared to the known signatures in the database. At location 212, mobile communication unit 210 may provide a second signature. The first and second signatures may be consecutive, i.e. no other signature is provided between the times when the first and second signatures are provided.

The signature from mobile, communication unit 210 at location 212 comprises, at the first point in time:
(i) Control information;
(ii) A set of cells, the set of cells being cells observable by mobile communication unit 210; and
(ii) Received power level information, for signals received by mobile communication unit 210 from the observable cells. As FIG. 2 is drawn, the cells 220, 236 and 238 may, for example, be observable from location 212.

The first signature from mobile communication unit 210 at location 212 may be found to be identical to one of the known signatures in the database, or be sufficiently similar to one of the known signatures. The location 212 of mobile communication unit 210 can then be estimated as that of the known signature. However, this is not the usual case. There is a risk of inaccuracy, when basing a location estimate on the matching of just the first signature from communication unit 210 with just one known signature in the database. However, if the first signature comprises all of control information, a set of cells and received power information, then the risk of inaccuracy is greatly reduced.

The signature information obtainable for any particular mobile communication unit 210 may depend on the design of the system, the location, and other variables. Usually, a mobile communication unit in communication with a cellular wireless communication system will be able to report the received power levels of several cells in the vicinity. The identity of the cells will also be contained in the report from the mobile communication unit. That report may be obtained from a management module of the cellular wireless communication system. That module may be the Operational Support System of a 3G cellular wireless communication system. The report may also be obtained from probes integrated into or attached to the wireless communication system. Other measurement and control information associated with the mobile communication unit may be obtainable from these sources, including:
(i) timing advance information;
(ii) burst throughput rate;
(iii) dynamic rate control (such as Channel Quality Indicators);
(iv) signal-to-noise ratio (such as Reference Signal Receive Quality).

This information can be available throughout the entire history of a call or data 'connection'. It may also be available for earlier calls. This is especially true in '24×7' analysis systems, which capture and process every call of every subscriber. When a mobile communication unit can produce GPS information about its location, this information is associated with the power levels and other measurement/control information, to construct the known signatures. These known signatures may be considered to be "reference signatures".

Typically, the known signatures in the database will have been collected before a signature for which we want to provide a location estimate, such as first signature from mobile communication unit 210 at location 212. The known signatures may have been collected over days, weeks or months, prior to the first signature.

However, the invention may be applied as part of post-processing. This processing may occur some hours or days after the first signature was received from mobile communication unit 210. In this case, there may also be known signatures in the database for calls that were made after the first signature was obtained, i.e. the signature for which a location must now be estimated. Referring back to FIG. 2, the series of signatures for locations 250-256, and/or the series of signatures for locations 260-264, may therefore be obtained after the first point in time, when the signature for mobile communication unit 210 in location 212 was obtained.

There may be more than one known signature in the database that is similar or even identical to the signature obtained by mobile communication unit 210 at location 212. These known signatures can, however, be differentiated. A particular known signature may at least partly be selected on the basis of 'context' information. The context information links the known signature to a location and/or a timing of another known signature in the database that was received from the same mobile communication unit as the first known signature.

Figure 3:
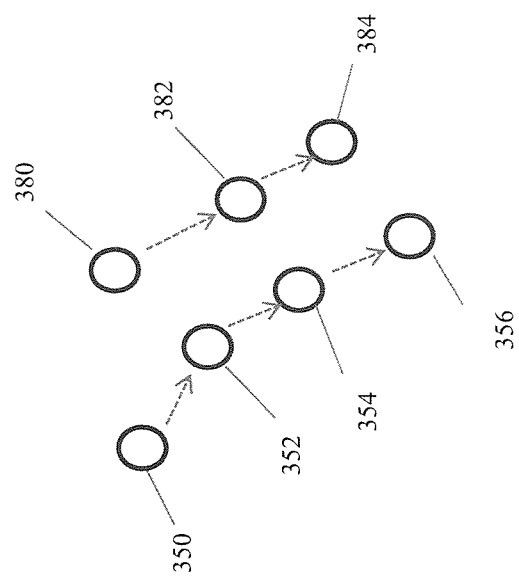
FIG. 3 is a plan view of sequences of mobile communication unit locations in a cellular wireless communication system.

The context information can be understood by considering locations 250, 252, 254 and 256. FIG. 3 shows these four locations, as 350, 352, 354 and 356. In addition, FIG. 3 shows three other locations 380, 382 and 384, for a different mobile communication unit travelling through the wireless communication system 200 than the mobile communication unit that provided signatures from locations 350-356. Each of the locations 350-356 and 380-384 results in a known signature that can be added to the database, together with the location at which the signature was obtained, and a timestamp.

The first signature from mobile communication unit 210 at location 212 may turn out to match the signatures from two different locations shown on FIG. 3. In this example, it is important to appreciate that location 212 on FIG. 2 is an illustrative location, which could be anywhere within FIG. 2. Location 212 is in fact illustrated in a part of FIG. 2 that is far from all of points 250-256 and 260-264, in order to keep FIG. 2 as uncluttered as possible. The 'matching' may either be because the first signature is identical to the signatures from two different locations shown on FIG. 3, or because the first signal has a comparable degree of similarity to the signatures from two or even more of locations 350-356 and 380-384.

For example, the control information, set of cells and power received from each observable cell at both points 354 and 382 may be identical, and match those of the first signature from mobile communication unit 210. Alternatively, the known signatures obtained at points 354 and 382 may differ by the same amount from these parameters of the first signature.

The 'context' information available in the database may be used to refine this information. In particular, the context information may identify the known signature for only one of the two locations 354 and 382 as being the best match for the first signature from mobile communication unit 210 at location 212. This therefore resolves the ambiguity, compared to the situation where the known signatures from points 354 and 382 are an 'equally good' match for the first signature. For example, the best match may turn out to be the known signature from point 354.

First Example of the Use of Context Information

A detailed example of how context information might resolve the question of whether location 354 or location 382 is the best match is as follows. In addition to the signature from location 354, there is also a known signature in the database for location 356, in the example shown in FIG. 3. The known signature in the database for location 356 has been provided by mobile communication unit 258, at a time shortly after mobile communication unit 258 provided the known signature from location 354. In addition, FIG. 3 shows the location 356 as being a given distance way, in a given direction, from location 354. If the top of FIG. 3 is the direction north, then location 356 is to the south south-east of location 354. It is however important that the database has a location measurement for the signature from location 356. Analogously, the database contains a known signature from location 384, obtained from the same mobile communication device that provided a signature from location 382 shortly beforehand.

Returning to FIG. 2, the mobile communication device 210 that we wish to locate occupied location 214 after location 212, although locations 212 and 214 are both unknown. When at location 214, mobile communication device 210 provided a second signature. This second signature can be compared to the known signatures from locations 356 and location 384.

In this illustrative example, the second signature from mobile communication device 210 is found to be similar to the signature from location 356, but dissimilar to the signature from location 384. This additional information allows resolution of the ambiguity. Location 212 of mobile communication unit 210 is similar to location 354. Hence the location data held in the database for the known signature obtained from location 354 is used as the estimate of the location of mobile communication unit 210 when it provided the first signature from location 212. In other words, mobile communication unit 210 was much more likely to have been at location 354 when it produced the first signature than at location 382.

Second Example of the Use of Context Information

We can consider again the situation shown in FIG. 3, where the database holds known signatures from locations 354 and 356, which were provided by mobile communication unit 258. The database also holds known signatures from locations 382 and 384, which were provided by another mobile communication unit.

In a second illustrative example, the first signature from mobile communication unit 210 at location 212 matches the known signatures from locations 354 and location 382 equally well. However, the first signature also contains measurements that cannot be used in the comparisons with the known signatures from locations 354 and 382. Assume, for example, that the first signature from mobile communication unit 210 contains measurements from six observable cells. Five of those cells are also recorded in the known signatures from locations 354 and 382. However, the sixth cell in the first signature is absent from both the known signatures from locations 354 and 382. Hence the information in the first signature about the sixth cell is unusable, when the first signature is only compared to the known signatures from locations 354 and location 382.

However, the known signature from location 356 may contain an observation of the sixth cell. If the known signature from location 384 does not contain an observation of the sixth cell, then the ambiguity has been resolved. The first signature is more likely to correspond to the known signature from location 354, than the known signature from location 382. In this illustrative example, no information from a second signature from mobile communication unit 210 at location 214 was needed. The context information that was used involved only additional known signatures in the database, which could be compared to additional data in the first signature itself.

Summarising the general case that underlies the two illustrative examples above, the signature from location 354 is one of the series of signatures from locations 350, 352, 354 and 356, each derived for one particular mobile communication unit. That might be mobile communication unit 258 in FIG. 2. The other known signatures from points 350, 352 or 356 may provide information that leads to the conclusion that the known signature from point 354 is the best match for the first signature from mobile communication unit 210 at location 212. In this case, the signatures from point 380 and/or point 384, which are before and after point 382, may provide information that, in effect, demonstrates that the known signature from location 382 is not as good a match for the first signature as the known signal from location 354.

When compiling the database of known signatures, the order in which the known signatures are obtained for a given mobile communication unit is preserved. This information provides one aspect of the "context" for each known signature in the database. Thus the context information relates at least to the order in which each series of signatures was obtained, and the times at which they were obtained. Such context information may resolve the question of whether the signature from mobile communication unit 210 at location 212 indicates that mobile communication unit 210 is at location 354 or location 382.

Table 1 below shows an illustrative example of a series of known signatures. The signatures were obtained for one mobile communication unit M1, such as mobile communication unit 258 in FIG. 2. The signatures were obtained at four locations, such as locations 350-356 in FIG. 3. In Table 1, mobile communication unit M1 is assumed to have been at location X,Y at time $T_1$. At each successive location, shown in each successive row of Table 1, the location changes by amounts such as x1, y1. The locations may be provided by a location subsystem, such as a GPS unit, in mobile communication unit M1. The values x1, y1 may for example be of the order of 1 meter-50 meters. Also, in each successive location shown in each successive row of Table 1, the timepoint increases in value. The final column of Table 1 shows that the second signature was recorded 2 seconds after the first. The third signature was recorded 5 seconds after the first. The fourth signature was recorded 25 seconds after the first.

Table 2 has been provided for known signatures obtained from another mobile communication unit M2, such as mobile communication unit 266. The signatures in Table 2 were obtained at successive locations, such as locations 380-382.

The entries in the final column of Table 2 show that the three signatures from mobile communication unit M2 were obtained at times $T_2$, $T_2+3$ seconds, and $T_2+6$ seconds. $T_2$ may be a time that is very different from $T_1$. For example, the signatures in Table 1 may have been obtained on a different day or in a different month than those in Table 2. The distance increments such as x10, y11 in Table 2 will normally be very different from the increments x1, y1 in Table 1. However, in the example shown in Tables 1 and 2, mobile communication units M1 and M2 can at times see the same cells. The locations in both Table 1 and Table 2 are thus each given relative to a location X,Y. The two sets of signatures may be obtained, for example, from location sequences that are a few hundred meters apart.

TABLE 1

Known signatures obtained successively from mobile communication unit M1

| | | Measurements included in each signature for mobile M1 | | | | | | |
|---|---|---|---|---|---|---|---|---|
| Signature number in sequence | Location measurement for point at which signature obtained | Set of observable cells | Measurement of burst rate of received signals | Received power level information | Dynamic rate control | Signal-to-noise ratio | Timing advance information | Time of capture of signature |
| 1 | X, Y (point 350) | 220, 222, 224 | Yes | Yes | Yes | Yes | Yes | $T_1$ |
| 2 | X + x1, Y + y1 (point 352) | 220, 222, 224 | Yes | Yes | No | Yes | No | $T_1$ + 2 seconds |
| 3 | X + x2, Y + y2 (point 354) | 220, 222, 224, 230 | Yes | No | No | Yes | No | $T_1$ + 5 seconds |
| 4 | X + x3, Y + y3 (point 356) | 222, 224, 230 | Yes | Yes | No | Yes | Yes | $T_1$ + 25 seconds |

TABLE 2

Known signatures obtained successively from mobile communication unit M2

| | | Measurements included in each signature for Mobile M2 | | | | | | |
|---|---|---|---|---|---|---|---|---|
| Signature number in sequence | Location measurement for point at which signature obtained | Set of observable cells | Measurement of burst rate of received signals | Received power level information | Dynamic rate control | Signal-to-noise ratio | Timing advance information | Time of capture of signature |
| 1 | X + x10, Y + y10 (point 380) | 222, 224, 230 | Yes | Yes | No | Yes | No | $T_2$ |
| 2 | X + x11, Y + y11 (point 382) | 222, 224, 230 | Yes | Yes | No | Yes | No | $T_2$ + 3 seconds |
| 3 | X + x12, Y + y12 (point 382) | 222, 224, 230 | Yes | No | No | Yes | No | $T_2$ + 6 seconds |

The 'context' information available from each of Tables 1 and 2 includes:
(i) The order in which each signature was obtained; and
(ii) The fact that each of the two sequences of signatures is for the same, given mobile communication unit, in the cellular mobile communications system 200.

The different signatures within either table do not have to come from just one call. Here a 'call' is a broad term. A 'call' includes voice calls and data 'connections', which may not involve a voice communication. Looking at either table, the different signatures within the table come from the same mobile communication unit, and are in temporal order. The temporal order is recorded by the timestamp. It will often be the case that multiple signatures will be available from the same call. However, the bursty nature of data communications is such that one call (data connection) may end after one signature is obtained. But then a new "call" (data connection) could easily start up in time for the capture of the next signature in the table. So, for example, signature 1 in Table 1 may come from a first data connection of mobile M1.

Signatures 2-4 in Table 1 may come from a second, subsequent data connection of mobile M1, which started immediately after the first data connection. This multiple-call (multiple-connection) scenario is equivalent to the 'same-call' scenario, provided that the entries in the table are recorded in succession from one mobile communication device.

The varying times between successive signatures are shown in the final column of each table. These varying times, and the varying speeds of movement of each mobile communication device M1 and M2, may lead to wide variations in the distance moved by each mobile communication unit between successive signatures. However, the signatures in one sequence will still be obtained from one mobile communication unit, in order, at known locations and timepoints.

Figure 4:
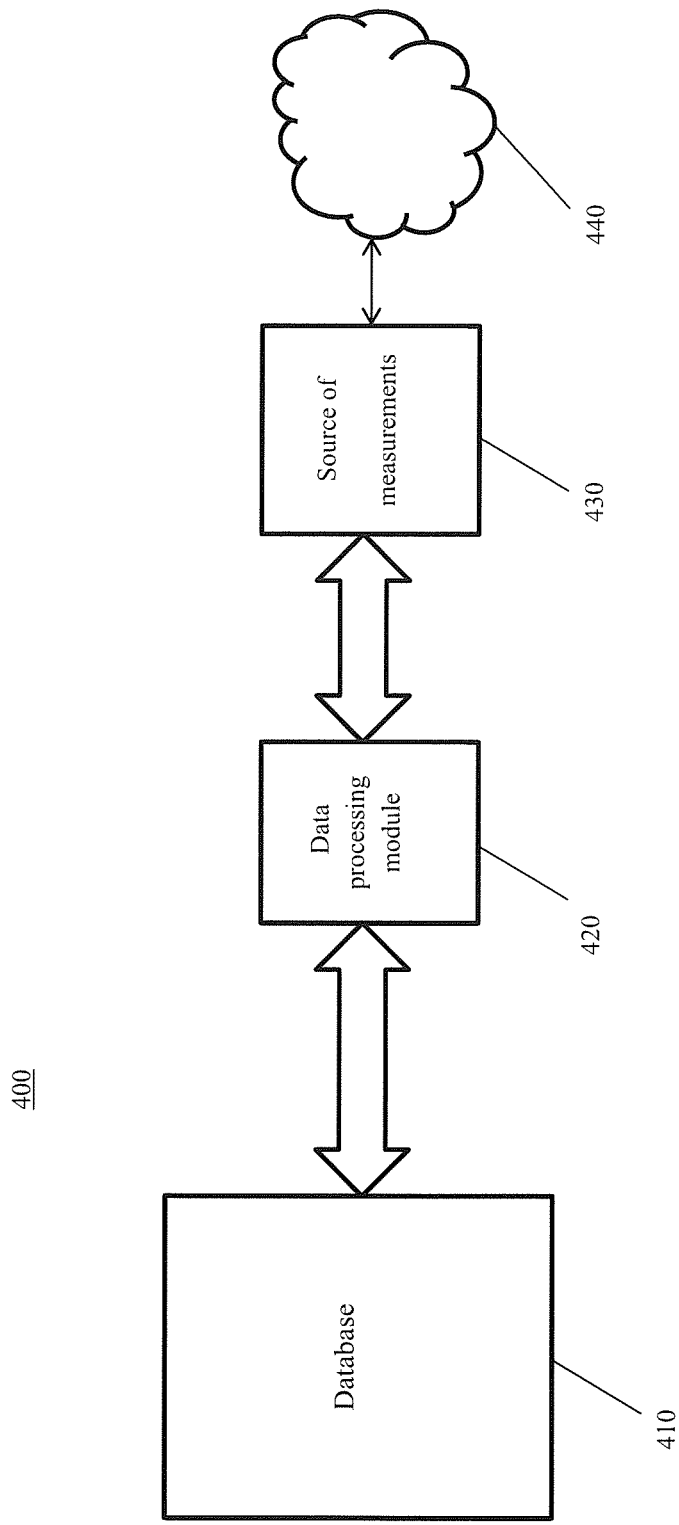
FIG. 4 illustrates a cellular wireless communication system.

FIG. 4 illustrates parts of a cellular wireless communications system 400 in accordance with the invention.

Reference 410 illustrates the database. Database 410 may comprise many thousands of known signatures. The four known signatures in Table 1 and the three known signatures in Table 2 may be held in database 410.

Reference 420 indicates a data processing module. Data processing module 420 may process signatures from mobile communication units such as mobile communication unit 210, whose location is to be estimated. Thus data processing module 420 may match a first signature with known signatures from database 410.

Data processing module 420 may also add signatures to database 410, thereby creating known signatures for later matching. Data processing module 420 may only add signatures to database 410 when those signatures meet certain criteria. For example, each signature may need to be one of at least two obtained from the same mobile communication unit, each signature having a location estimate known to a given accuracy. Alternatively or additionally, there may be a threshold number of items of information in a signature, for it to be added to the database 410. So, for example, there may need to be entries in a minimum number of the columns in tables 1 and 2, for a signature to qualify for addition to database 410. Data processing module 420 may also delete known signatures from database 410, for example when they are older than a certain threshold age, and/or when database 410 is full.

Reference 430 indicates a source of measurements about mobile communication units in network 440. The source of measurements 430 may, for example, be the operational support system (OSS) of a communications network.

The known signatures in database 410 can be used as reference signatures. However, they are not, strictly speaking, 'RF (radio frequency) signatures', because they involve more than just RF information. In known systems, the term 'reference signature' may be used for RF signatures, containing for example just power measurements.

Even though GPS information about location of any particular mobile communication unit may be infrequent, it can be accumulated steadily over time in a '24×7' system. This allows the construction of a detailed database 410 of known signatures. Thus signatures may be obtained from commercial operation of mobile communication units, as they make voice calls and/or data connections. The measurements may be obtained from mobile communication units' measurement reports. These may simply measure such parameters as received power levels from base stations, even without a call or data connection for payload traffic being set up.

The accumulation of signatures from known locations for the database 410 can be accelerated by sending out a "drive test" (or "walk test") team, to record locations and other information while making test calls. This may serve the purposes of starting off, or generally increasing, the quantity of known signatures in database 410. This can be done across a broad area, or in a targeted area. The targeted area may be based on areas that are known or suspected to have problems, or which have high volumes of traffic. When accumulated over time in database 410, these known signatures serve as contemporary reference signals as well as historical data points. All these types of known reference signatures can be compared with measurement/control information from mobile communication units that do not provide GPS or other location details, and for which a location estimate is wanted.

As stated in connection with FIG. 3, there may be more than one known signature in database 410 that is similar or even identical to the signature obtained by mobile communication unit 210. These known signatures can, however, be differentiated. To understand this process, it is instructive to consider a detailed example of parts of a short sequence of signatures. This demonstrates that it may not be adequate to take any piece of measurement/control information "out of context", for purposes of geo-location.

Table 3 provides an illustrative example of the types of measurement that may be obtained in a short sequence of signatures. These signatures become 'known' signatures in database 410. Table 3 shows parts of three successive signatures R1, R2 and R3, which are obtained from one mobile communication unit M3. M3 may, for example, again be mobile communication unit 266 of FIG. 2.

TABLE 3

Known signatures obtained successively from mobile communication unit M3

| Signature | Location | Time | Contents of signature |
|---|---|---|---|
| R1 | X1, Y1 | T1 | I1: Cell 1019 was seen at power level P1; and cell 9 was seen at power level P2 |
| R2 | X2, Y2 | T2 | I2: Burst rate was B1 from cell 1019 |
| R3 | X3, Y3 | T3 | I3: Burst rate was B2 from cell 1019 |

The contents of each signature in Table 3 has been given a reference I1, I2 or I3. Taking the example of signature R2, the information I2: "the burst rate was B1 from cell 1019" at time T2, is known.

Assume that a 'first signature' F is obtained from a mobile communication unit 210 whose location is unknown. If first signature F contains the information "the burst rate was B1 from cell 1019", then data processing module 420 will indicate that first signature F matches known signature R2.

However, there may be a prohibitively large number of known signatures in the database that also have the information "the burst rate was B1 from cell 1019". We can call this large group of known signatures the set K. The known signatures in set K may be spread over a large area. This would render the accuracy of geo-location of mobile communication unit M3 at timepoint T2 less than acceptable. Set K will usually be very large, if the first signature F is only required to be similar to, rather than identical to, known signatures in database 410, for there to be a match. 'Similar to' here may mean within, for example, the same to within +/−10% of the burst rate, or some other suitable range.

However, the invention may use information from other known signatures in database 410, in order to select the particular known signature from set K whose location actually corresponds most closely to the location of first signature F, and hence mobile communication unit 210. Referring back to the examples in all of Tables 1-3, the database 410 preserves the context of each known signature. This context information is therefore available to assist in the location estimation by data processing module 420. Considering the example in Table 3, another known signature R1 was obtained at timepoint T1, just before known signature R2. The information I1 in known signature R1 was that, at time T1, a measurement report stated: I1="cell 1019 was seen at power level P1 and cell 9 was seen at power level P2".

Contextual association of I2 with I1 can be written as "I2 given I1" or "I2|I1". The first signature F from mobile communication unit 210 may contain similar information to both information I2 in signature R2, and information I1 in signature R1. However, the other signatures in set K, if they were obtained at locations far from locations X2, Y2 or X1, Y1, will be excluded from matching information I1. For example, the other signatures in set K may have no measurement for cell 9, or a very different measured power level for cell 9 than power level P2.

Using this approach, first signature F has been found to match known signature R2, by also using information from known signature R1. Similarly, parts of the first signature F may be found to be exactly equal to, or similar to, the information I3 of known signature R3. Thus contextual association may dramatically reduce the number of signatures in set K that match the first signature F. The location 212 of mobile communication unit 210 can be estimated, with confidence, as location X2, Y2 of known signature R2 from database 410.

The above example can be made more generic. Consider a reference signature: $S_{i,j} = \{I_i, L_j\}$, meaning that Information with some index i is associated with a Location with index j.

A known signature S can now be considered, with signature $S_{2,2}$ occurring after $S_{1,1}$ and before $S_{3,3}$. In particular, we can consider: "$S_{2,2}$ given $S_{1,1}$" or "$S_{2,2}|S_{1,1}$".

There may also be some other contextual known signatures in database 410, such as "$S_{2,3}|S_{3,4}$" and "$S_{2,5}|S_{4,5}$". Each of the reference signatures $S_{2,2}$, $S_{2,3}$ and $S_{2,4}$ has information I2. So, in this example, an attempt to geo-locate the first signature F using just information $S_{2,2}$ would lead to a finding that first signature F is similar to all of $S_{2,2}$, $S_{2,3}$ and $S_{2,5}$ (that is, three different locations: L2, L3 and L5.) So our set K of known candidate signatures contains all of $S_{2,2}$, $S_{2,3}$ and $S_{2,5}$.

However, each of reference signatures $S_{2,2}$, $S_{2,3}$ and $S_{2,5}$ is known in context. If information I1 is kept "in context" then first signature F having "I2|I1" obtained from mobile communication unit 210 is only similar to "$S_{2,2}|S_{1,1}$". This is because information I2 of first signature F matches information I2 in $S_{2,2}$, and information I1 of first signature F matches I1 of known signature $S_{1,1}$.

The other two signatures in this set K can be eliminated, and thus the locations of those other members are not a possible location for mobile communication unit 210. This because:
(i) Location L3 is not a candidate, because the information element I3 of $S_{3,4}$ in the contextual signature "$S_{2,3}|S_{3,4}$" is not similar to I1.
(ii) Location L5 is not a candidate, because the information element I4 of $S_{4,5}$ in the contextual signature "$S_{2,5}|S_{4,5}$" is not similar to I1.

In fact, location L2 is the only viable candidate, because the information element I1 of $S_{1,1}$ in "$S_{2,2}|S_{1,1}$" is similar to I1. Hence location L2 is the geo-location output in this example.

In this example, the information element I1 of $S_{1,1}$ was not just similar, but identical to I1 from first signature F. This may not be the case, and is not required in all embodiments of the invention. It is sufficient that the information elements of F and the known signature be within a prescribed margin of each other. That margin may be defined across multiple dimensions. For example, in the case of a one-dimensional variable such as burst rate, it can be sufficient to be within +/−10%.

As another example, in the case of a one-dimensional variable such as received power in decibels relative to a milliwatt (dBm), it can be sufficient to be within 3 dB.

As another example, in the case of a multi-dimensional variable such as received power across N cells (N>1), it can be sufficient to have the root of the mean squared error (RMS), defined across all N cells, within 3 dB.

Additional contextual information can also be used to perform geo-location using known signatures. Assume that there is an additional piece of information I3 available, which may occur after I2. It is then possible to consider "I2|I1, I3". This is "I2 given I1 and I3". Now data processing module 420 can compare "I2|I1, I3" to all reference signatures of the form "S2,j|Sk,l, Sm,n". By definition, we expect the most favourable comparison to be with "S2,2|S1,1, S3,3", which means that Location L2 will be the output.

In the above examples, the first known signature is selected on the basis of the contextual link between at least the first and second known signatures in database 410, which were obtained from one mobile communication unit such as 266. In the example of "I2|I1, I3", the first known signature was selected on the basis of its contextual link to two other known signatures in database 410, with all three of the known signatures having been obtained from the same mobile communication unit such as 266. This differs from the more general situation, where the first known signature and the second known signature came from totally different calls by totally different individuals.

Figure 5:
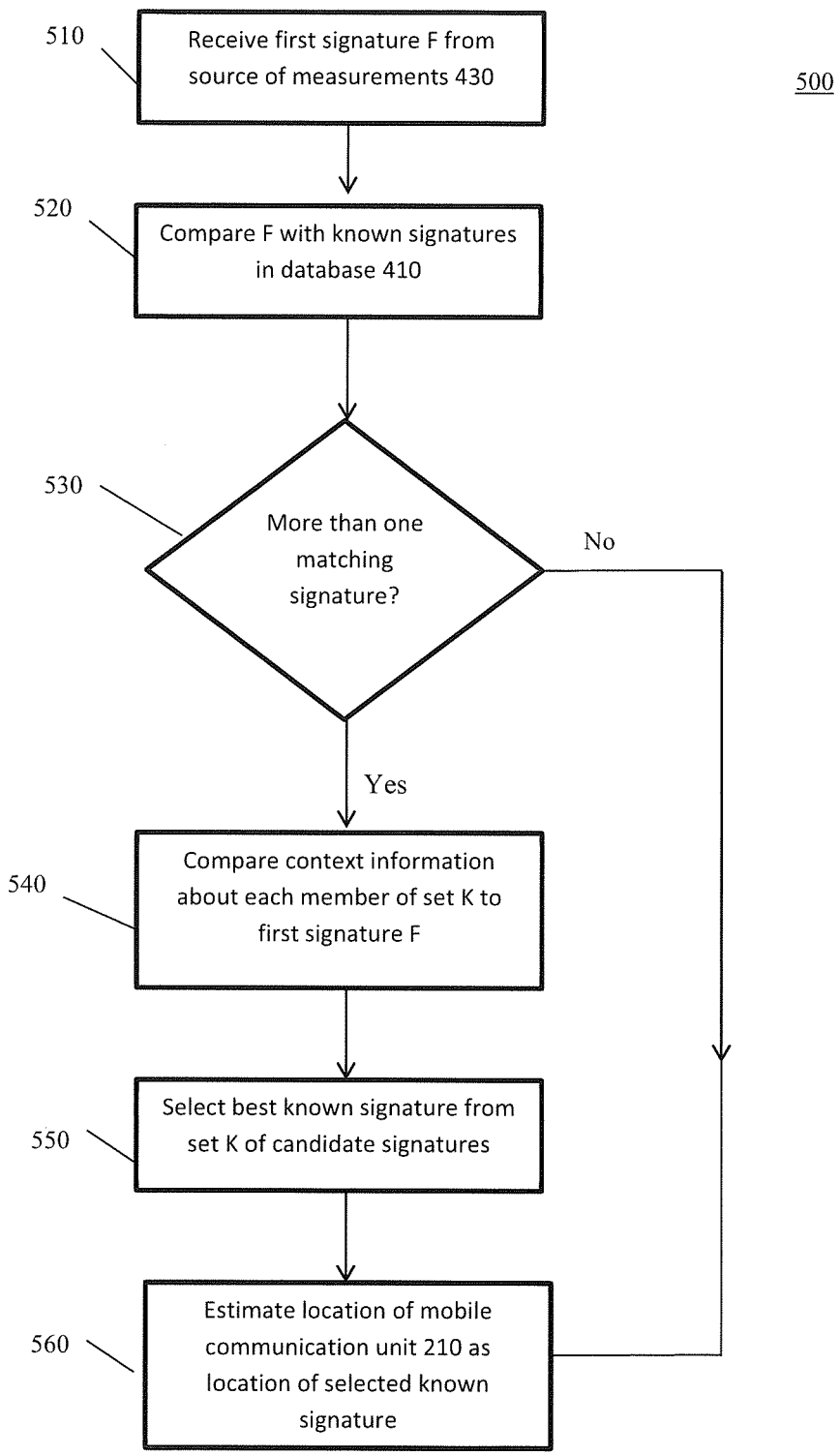
FIG. 5 illustrates a method in accordance with an embodiment of the invention.

FIG. 5 illustrates steps of a method 500 that may be followed by data processing module 420 of FIG. 4. Method 500 starts with a first signature F, obtained from a mobile communication unit 210 at an unknown location 212 in a cellular wireless communication system 200.

In step 510, data processing module 420 receives a first signature F, from source of measurements 430. There is a need to provide a location estimate for first signature F.

In step 520, data processing module 420 compares the various information elements in first signature F with known signatures in database 410. Methods for matching elements (parts) of first signature F with known signatures in database 410 are discussed after the discussion below of FIG. 5.

In step 530, a decision is made. The number of known signatures that match first signature F is assessed. If there is only one known signature that matches first signature F, then the method proceeds to step 560. If more than one known signature matches first signature F, then the method proceeds to step 540. If more than one known signature matches first signature F, then we can assume that each member of a set K of signatures S1 ... SN matches first signature F. Although not shown in FIG. 5, a further possible outcome is that no matches are found. However, a database with many entries should provide at least one match in normal circumstances.

In step 540, the context information for each signature of set K is compared to what is known about signature F. Two examples of this process were described above in connection with FIG. 4. It may be known that signature F was immediately preceded, or followed, by another measured signature, from the same mobile communication unit 210 of unknown. Information from that other signature may enable data processing module 420 to select just one known signature from database 410, for which the context information matches the information known from the other measured signature.

In step 550, the best candidate known signature from set K is selected, and the method proceeds to step 560. Possible approaches to finding the best candidate signature include: (i) identical match; (ii) least mean squared error. With a least mean squared error approach, terms of different type are scaled appropriately. So that a difference in two power different measurements, having units of milliwatts, can be fairly compared with, for example, average Call Quality Indicator (CQI) differences, which may be dimensionless and have no units.

In step 560, the location 212 of the mobile communication unit 210 is estimated as the location of the selected known signature. There is also an opportunity to add some variability in the output location, as a function of how good a signature match there was in step 550. For example, if the match had no error at all associated with it, it may be reasonable to estimate the location of the mobile communication unit that provided signature F as being precisely where the known signature was. That might be at Cartesian coordinate (X, Y). However, if there is a relatively large amount of error with the degree of correlation or matching to the "best" known signature, then it may be reasonable to estimate the location as Cartesian coordinate (X+ex,Y+ey). Here "ex" and "ey" are random variables, with zero mean and variances, which are proportional to the amount of signature error.

The process of matching a first signature F from a mobile communication unit 210 of unknown location to known signatures in a database 410 may be carried out in one or more of several ways. One approach is to correlate each part of the first signature with a corresponding part of known signatures in the database. If the first signature is accompanied by another signature, recorded just before or after the first signature F by the same mobile communication unit 210, then each part of that further signature may also be correlated with corresponding parts of known signatures in the database. The known signature may then be selected, based on results of each correlation, and the location 212 of the mobile communication unit 210 may then be estimated as the location of the known signature.

The correlation may comprise determining the difference between each part of the first signature F and the corresponding part of known signatures in the database 410. These differences may then be squared, scaled and added. The scaling step ensures a fair comparison across all parts of the signature, even if the units of various measurements within the signature F and the known signatures differ. A further signature, recorded just before or after the first signature F, may be available, such as the signature from location 214 in FIG. 2. If a further signature is available, then the difference between each part of the further signature and the corresponding part of known signatures in the database may be determined. These differences may be squared, scaled and added. This process leads to the selection of two known signatures. The selection may be based on the total squared differences or, equivalently, the "mean squared errors". Here the "mean" introduces a trivial 1/N term in front of the total and the word "error" is another way of saying "difference". The location 212 of the first mobile communication unit 210 is then estimated as the location of the selected signature correlated with first signature F.

The process described thus far may be extended. In particular, it may be parametrically extended to an arbitrary number of other pieces of information. Such an extension would increase the accuracy of selection of the known signature. The parametric extension may be continued as far as desired, in order to achieve the desired accuracy. This is especially the case if there are still excessive numbers of disparate locations serving as candidate outputs, from the set of known signatures K. The process of narrowing down set K to one known signature can be understood by considering the following illustrative steps. The process stops after whichever step leads to a location estimate, otherwise the process passes to the next step.

Step 1: Evaluate known signatures for comparison with "I2|I1". If there is either just one favourable comparison, or only or a few known signatures close together, then select known signature's location as estimate of location of unknown mobile communication unit.

Step 2: Evaluate known signatures for comparison with "I2|I1, I3". If there is either just one favourable comparison, or only or a few known signatures close together, then select known signature's location as estimate of location of unknown mobile communication unit.

Step 3: Evaluate known signatures for comparison with "I2|I1, I3, I5". If there is either just one favourable comparison, or only or a few known signatures close together, then select known signature's location as estimate of location of unknown mobile communication unit.

Step 4: Stop the process, when an upper limit of number of information pieces, such as 6, is reached.

In steps 1-3 of the above flow sequence, "close together" depends on the accuracy with which measurement of the location 212 of mobile communication unit 210 needs to be found. In a practical example, 'close together' may, for example, mean "within 20 meters."

The process of Steps 1-4 above can be viewed as involving successive sets of known signatures from database 410. Correlating each part of the first signature F with a corresponding part of known signatures in the database 410 provides a first set K of known signatures. Each member of set K matches the first signature F to within a predefined degree.

For each member of set K, it is possible to identify known signatures that were obtained immediately before or after the member of set K. So for a known signature such as that from location 354 in FIG. 3, we also have signatures from locations 352 and 356. The signatures from locations 352 and 356 are other known signatures, obtained from the mobile communication unit that provided the known signature from location 354, which signature is a member of set K. This provides members of a second set L of known signatures. The signatures from locations 352 and 356 are two members of set L.

For each member of second set L, we can correlate each part of the second signature with a corresponding part of the member of second set L. The results of this correlation can be used to select the correct first known signature. The correct signature is the member of set K for which the immediately preceding or following signature in set L showed the highest degree of correlation with the second signature. The estimate of the location of the mobile communication unit at the first point in time is then the location of the selected first known signature.

Figure 6:
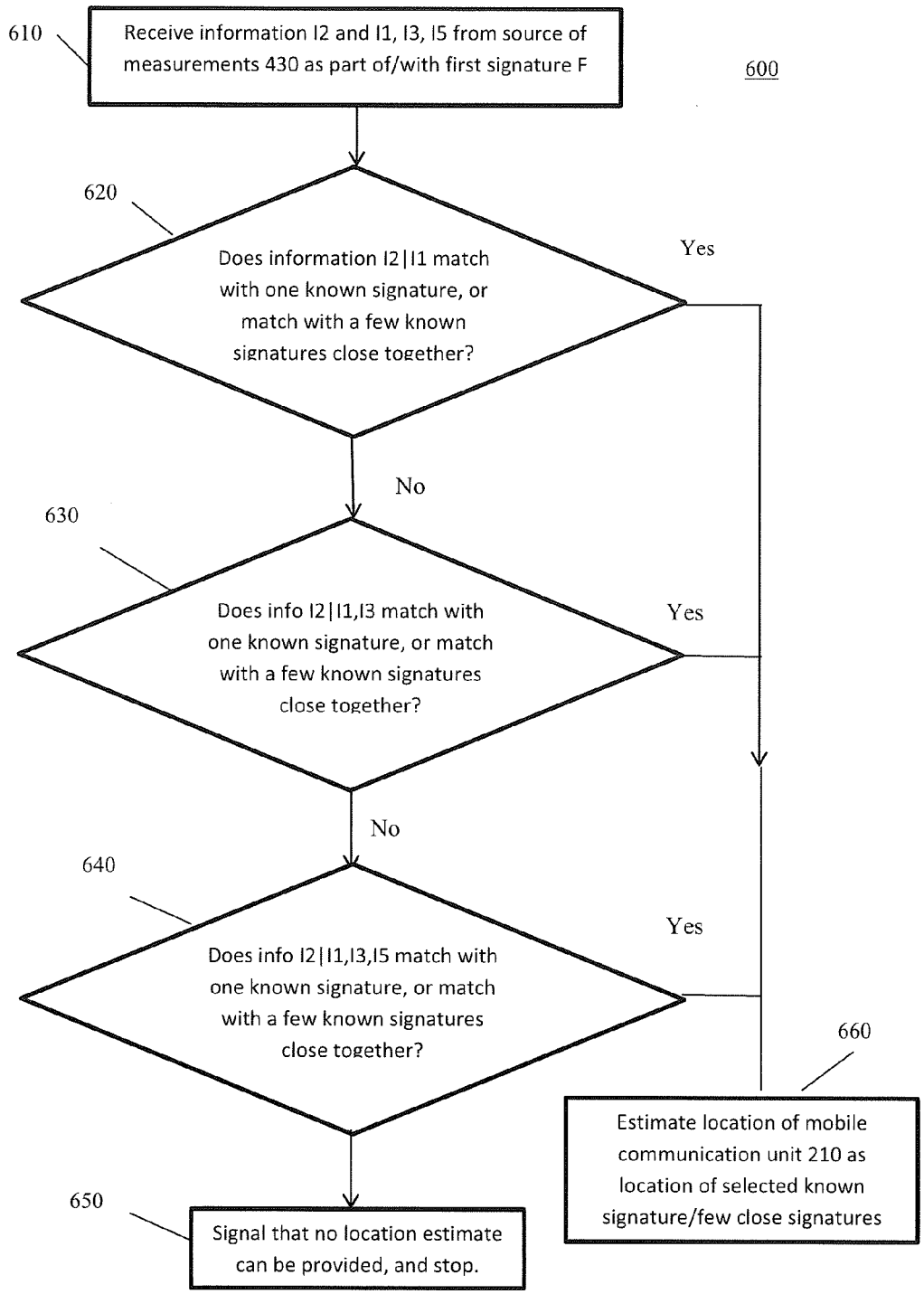
FIG. 6 illustrates details of method steps in accordance with an embodiment of the invention.

FIG. 6 illustrates details of this process, which may be carried out by data processing module 420. In step 610, information is received about the measurements obtained for mobile communication unit 210 at unknown location 212. Information I2 may be part of first signature F. Other information I1, I3 and I5 may be available from mobile communication unit 212, obtained at times close to the timepoint where signature F was obtained.

In step 620, data processing module 420 compares I2|I1 to pairs of known signatures in database 410. If the comparison results in a match with one known signature, or a match with a few known signatures close together, then the method moves to box 660. If not, then the method proceeds to step 630.

In step 630, data processing module 420 compares I2|I1, I3 to known signatures in database 410. If the comparison results in a match with one known signature, or a match with a few known signatures close together, then the method moves to box 660. If not, then the method proceeds to step 640.

In step 640, data processing module 420 compares I2|I1, I3, I5 to known signatures in database 410. If the comparison results in a match with one known signature, or a match with a few known signatures close together, then the method moves to box 660. If not, then the method proceeds to step 650. In the illustrative example of FIG. 6, the process stops at step 650, with the result that no definitive location estimate can be provided.

In step 660, the location of mobile communication unit 210 is selected as being that of the one selected known signature, or the location of the few matching signatures.

In step 630, the attempt to match the information I2|I1, I3 with known signatures may only need to be carried out for known signatures that did match information I2|I1 in step 620, to within a given degree of accuracy. In step 640, the attempt to match the information I2|I1, I3, I5 with known signatures may only need to be carried out for known signatures that matched information I2|I1, I3 in step 630, to within a given degree of accuracy.

An advantage of the invention in comparison with known systems can be appreciated from the following example. As explained previously, the invention preserves the context of each piece of information. This enables the construction of known signatures with 'higher-order' dimensions. These dimensions can then be used in the look-up process, to estimate the location 212 of a mobile communication unit 210. As an example of how this might work, we can consider the situation where a measurement report from mobile communication unit 210 reports three pilot signals from three different base stations 220, 236 and 238 in a network. The three power levels are power levels P1, P2 and P3.

On its own, this measurement report has three dimensions. One dimension corresponds to each pilot. The measurement report serves as an input to the look-up process. In the present invention, however, the three dimensions for the measurement report under consideration can be used together with the dimensions of a second measurement report from the same mobile communication unit 210, the second measurement report being obtained at an earlier or later point in time. This second measurement report can be considered to constitute a second signature from mobile communication unit 210. Alternatively, we could put all the measurements together and process them as one signature, which is the first signature from mobile communication unit 210 referred to previously. In a case where the second measurement report also has three dimensions, we have a new 'signature' with a total of six dimensions. The three dimensions of the second measurement report may be, for example, three other pilots that were measured at the timepoint when the second measurement report was compiled. Hence data processing module 420 then uses this six-dimensional signature, as an input to the look-up process to find the best known signature in database 410.

As yet another concrete example, consider the situation where a control message obtained from mobile communication unit 210 indicates the burst throughput is B1. B1 is a one-dimensional quantity. Assume further that B1 is preceded by another measurement report, which reports three pilots, i.e. a three-dimensional quantity. These dimensions can be combined to produce a four-dimensional signature, which data processing module 420 uses as an input to the look-up process.

Both the six and four dimensional signatures from mobile communication unit 210 can be added to the database, when a sufficiently accurate location estimate for them has been derived using the method of the present invention.

Figure 7:
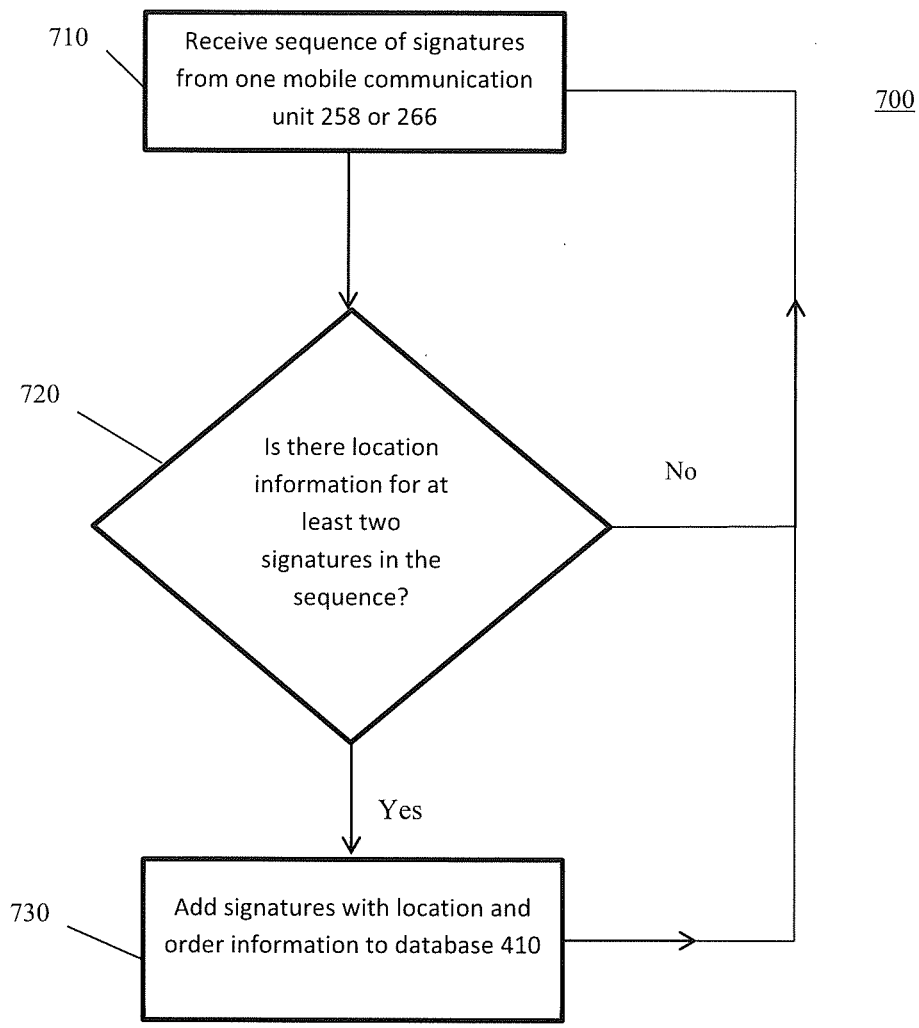
FIG. 7 illustrates a method of populating a database in accordance with the invention.

FIG. 7 illustrates a method 700 of populating a database 410 of mobile communication unit reference signatures. These signatures can then be used to geo-locate a mobile communication unit in a cellular wireless communications system 200, as described previously.

Step 710 of the method comprises receiving a sequence of two or more signatures from a mobile communication unit such as mobile communication unit 258 or 266 in FIG. 2. These are signatures produced during commercial operation in the cellular wireless communications system. Each signature comprises measurement information and a measured location of the mobile communication unit, at a timepoint when the signature was obtained.

Step 720 verifies that at least two signatures of the sequence from the same mobile communication unit have location information. If that is not the case, the method returns to step 710, to receive a further sequence of signatures.

When the answer in step 720 is yes, then the method proceeds to step 730. The sequence of two or more signatures is then added to the database 410 of mobile communication unit known reference signatures, along with the order in which the two or more signatures were obtained, and an indication that the two or more signatures were obtained from the same mobile communication unit. After step 730, the method returns to step 710.

The method 700 may comprise the database 410 storing, in the database 410, a timestamp for each of the two or more signatures. The measurement information may comprise at least: location information; control information; a set of cells, the set of cells being cells observable by the mobile communication unit; and received power level information, for signals received from the observable cells.

Method 700 may further comprise interpolating between any of the two or more signatures in a sequence, to create additional reference signatures. Further reference signatures may be gathered by obtaining test measurements from test mobile communication units deployed in the cellular wireless communications system, together with location information and timing information for each test measurement. The test measurements, location information and timing information can then be added to the database 410, thereby creating either additional reference signatures, or an initial population of reference signatures.

Incompleteness in the database 410 of known signatures can be addressed by interpolation across existing known signatures in the database 410. This can be done in any of the ways familiar to practitioners reasonably skilled in the art. For example, using a path-loss model inferred from the known signatures, power levels can be interpolated, to obtain estimated locations.

The cellular wireless communications system 200 may thus achieve one or more of:
(i) Geo-location, using contextual information and contextual reference signatures, whether actual signatures or interpolated signatures;
(ii) Adaptive iteration on the degree of context, to satisfy accuracy objectives;
(iii) Broad use of non-RF measurements/control data for comparative signatures, such as burst rates, dynamic rate control information, other location-specific control information, in concert with more traditional RF measurements;
(iv) Construction of contextual reference signatures, using GPS and/or drive-test collection.

Although the cellular telecommunications technology may be LTE, GSM or UMTS, and cellular communications technology that provides received power level measurements at a mobile communication unit and other measurement/control information may be employed.

As described, the cellular wireless communications system 200 may thus employ one or more of:
(i) Access to measurement and control information (e.g., via OSS or probes);
(ii) Construction of and access to a database 410 of known signatures;
(iii) The ability to correlate/compare measurement/control from a mobile communication unit under study with measurement/control information from a known reference signature;
(iv) The ability to adaptively change the degree of context, when selecting a known signature from database 410.

As thus described, the cellular wireless communications system 200 may thus provide one or more of the following advantages:
(i) The ability to very accurately geo-locate subscribers;
(ii) The ability to mine and make maximal, contextual use of infrequent GPS information;
(iii) The ability to geo-locate, without the need for path-loss models, if desired.

The cellular wireless communications system may therefore provide one or more of the following:
(i) A method of geo-locating, which uses each piece of available information in the context of other pieces of information. Examples of information that may be used are: cells observed by a mobile communication unit; power levels, control information in the wireless communications system.
(ii) A method of correlating each piece of information with reference information, the reference information being associated with different locations. The associations may be either empirically or theoretically obtained.
(iii) Methods that can accommodate infrequently supplied GPS information, for example by employing GPS information to serve as references for correlation purposes.

Various aspects of the present invention as illustrated above in connection with FIGS. 2-7 may provide the advantage of enabling swift, efficient geo-location of GSM, UMTS & LTE users. This location may be achieved, without substantial impediment by penetration-loss, which may occur for mobile communication units in vehicles or in buildings.

The inventive concept herein described may be implemented within cellular communication networks adapted in accordance with various alternative wireless communication technologies and standards. Furthermore, the inventive concept may be implemented in a wide variety of signal processing circuits. It is further envisaged that, for example, a semiconductor manufacturer may employ the inventive concept in a design of a stand-alone device, such as a microcontroller, digital signal processor, or application-specific integrated circuit (ASIC) and/or any other sub-system element.

A computer-readable storage device may be provided, the storage device having stored executable program code for programming signal processing logic to perform the method of the invention. The computer-readable storage device may comprise at least one of: a hard disk, a CD-ROM, an optical storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

It will be appreciated that, for clarity purposes, the above description has described embodiments of the invention with reference to different functional units and processors. However, it will be apparent that any suitable distribution of functionality between different functional units or processors. For example, functionality illustrated to be performed by the separate controller of FIGs may be performed by other processors or controllers. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as field programmable gate array (FPGA) devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, a system and method for estimating a location of a mobile communication unit in a cellular wireless communications system has been provided. Also provided is a computer-readable storage device having executable program code stored therein for programming signal processing logic to perform the method of the invention.

The invention claimed is:

1. A method of estimating a location of a mobile communication unit in a cellular wireless communications system, the cellular wireless communications system comprising mobile communication units, the method comprising:
a processor;
compiling a first signature, for signals received by a first mobile communication unit at a first point in time, the first signature comprising: control information; a set of cells, the set of cells being cells observable by the first mobile communication unit; and received power level information, for signals received from the observable cells; estimating a location of the first mobile communication unit at the first point in time, the estimate being based on location information of a first known signature, the first known signature being selected by comparing the first signature with known signatures entered in a database, the known signatures comprising location information, wherein comparing the current signature with entries in the database of known signatures comprises: determining a difference between each part of the first signature and the corresponding part of a known signature in the database; squaring each difference; and scaling and adding the squared differences.

2. A method of estimating a location of a mobile communication unit in accordance with claim 1, further comprising:
selecting the first known signature at least partly on the basis of context information, the context information linking the first known signature to a second known signature in the database, wherein:
a second mobile communication unit provided both the first known signature and the second known signature; and
the second mobile communication unit provided the first and second known signatures in succession, with the second known signature provided either immediately before or immediately after the first known signature.

3. A method of estimating a location of a mobile communication unit in accordance with claim 1, wherein:
comparing the first signature with entries in the database of known signatures comprises correlating each part of the first signature with a corresponding part of known signatures in the database.

4. A method of estimating a location of a mobile communication unit in accordance with claim 1, wherein:
comparing the first signature with entries in the database of known signatures comprises determining a difference between each part of the first signature and a corresponding part of known signatures in the database; and
estimating the location of the mobile communication unit at the first point in time is based on selecting a known signature having each part equal to the corresponding part of the first signature.

5. A method of estimating a location of a mobile communication unit in accordance with claim 1, wherein:
estimating the location of the mobile communication unit at the first point in time is based on selecting a known signature with the lowest mean squared difference across all parts.

6. A method of estimating a location of a mobile communication unit in accordance with claim 1, further comprising:
compiling a second signature, for signals received by the first mobile communication unit at a second point in time, the first mobile communication unit providing the first signature and the second signature in succession, with the second signature provided either immediately before or immediately after the first signature;
the second signature comprising:
second control information;
a second set of cells, the second set of cells being cells observable by the mobile communication unit; and
second received power level information, for signals received from the observable cells; and
wherein the known signature is selected by comparing the first signature and the second signature with known signatures in the database.

7. A method of estimating a location of a mobile communication unit in accordance with claim 6, further comprising:
correlating each part of the first signature with a corresponding part of known signatures in the database, thereby deriving a first set K of known signatures that match the first signature to within a predefined degree;
for each member of set K, identifying known signatures that were obtained immediately before or after the member of set K, from the mobile communication unit that provided the member of set K, thereby identifying members of a second set L of known signatures;

correlating each part of the second signature with a corresponding part of the members of second set L of known signatures;
using the results of the correlation between the second signature and the member of set L to select the first known signature, wherein the first known signature is the member of set K for which the immediately preceding or following signature in second set L showed the highest degree of correlation with the second signature; and
estimating a location of the mobile communication unit at the first point in time as the location of the first known signature.

8. A method of estimating a location of a mobile communication unit in accordance with claim 7, wherein:
correlating each part of the first signature with a corresponding part of known signatures in the database comprises determining the difference between each part of the first signature and the corresponding part of a known signature in the database, squaring the differences, and scaling and adding the squared differences; and
correlating each part of the second signature with a corresponding part of the members of second set L of known signatures comprises determining the difference between each part of the second signature and the corresponding part of the member of the second set L, squaring the differences, and scaling and adding the squared differences.

9. A method of estimating a location of a mobile communication unit in accordance with claim 1, wherein the control information comprises at least one of:
timing advance;
burst throughput rate;
dynamic rate control, comprising at least channel quality indicators; and
signal-to-noise ratio.

10. A method of estimating a location of a mobile communication unit in accordance with claim 9, wherein the cellular wireless communications system is a very high data rate LTE communications system, and the control information comprises at least one of:
timing advance; and
burst throughput rate.

11. A method of estimating a location of a mobile communication unit in accordance with claim 1, wherein:
at least some of the known signatures in the database are provided by mobile communication units that comprise a dedicated location subsystem, the location information of the known signature being derived from the dedicated location subsystem.

12. A method of estimating a location of a mobile communication unit in accordance with claim 1, wherein at least some of the known signatures comprise information previously obtained from at least one of:
subscriber mobile communication units, during operation m the cellular wireless communications system; and
a test mobile communication unit, during test operation in the cellular wireless communications system.

13. A method of estimating a location of a mobile communication unit in accordance with claim 1, further comprising:
accessing at least part of the information comprising the first signature, by accessing the operation support system of the cellular wireless communications system.

14. A method of estimating a location of a mobile communication unit in accordance with claim 1, further comprising:
accessing at least part of the information comprising the first signature by probing signals passing through nodes of the cellular wireless communications system, the nodes forming part of the infrastructure of the cellular wireless communications system.

15. A method of estimating a location of a mobile communication unit in accordance with claim 1, wherein:
the first known signature comprises information obtained by interpolation between other known signatures in the database.

16. A method of estimating a location of a mobile communication unit in accordance with claim 15, wherein:
the interpolation uses an input path-loss model.

17. A method of estimating a location of a mobile communication unit in a cellular wireless communications system, the method comprising:
a processor;
receiving a first signature from a first mobile communication unit in the cellular wireless communications system, the first signature comprising information about signals received by the first mobile communication unit from one or more base stations of the cellular wireless communications system; using the first signature to select at least two known signatures from a database, each of the at least two known signatures having been obtained successively from a second mobile communication unit operating in the cellular wireless communications system; and estimating a location of the first mobile communication unit as the known location of one of the at least two known signatures based on squared difference calculations using scaling and addition of squared differences.

18. The method of claim 17, wherein the at least two known signatures each comprise location information for the second mobile communication unit at the timepoint at which the known signature was recorded, and further comprising:
selecting the two known signatures by correlating the first signature with each of multiple known signatures in a database.

19. The method of claim 17, further comprising:
the first mobile communication unit also providing a second signature, wherein the second signature is either a signature provided immediately before the first signature, or is a signature provided immediately after the first signature; and
selecting the two known signatures comprises correlating the first signature and the second signature with each of multiple known signatures in a database.

20. The method of claim 17, further comprising:
adaptively changing a degree of context, whereby the number of additional signatures from the first mobile communication unit or additional known signatures used in the correlation increases, until a correlation above a predetermined threshold is achieved, thereby identifying only one known signature that corresponds to the first signature, within a required degree of accuracy.

21. A method of populating a database of mobile communication unit reference signatures for geo-locating a mobile communication unit in a cellular wireless communications system, the method comprising:
a processor;
receiving a sequence of two or more signatures from a mobile communication unit during commercial operation in the cellular wireless communications system, each signature comprising: measurement information; and a measured location of the mobile communication unit at a time point when the signature was obtained; adding the sequence of two or more signatures as reference signatures to the database of mobile communication unit reference signatures, the database also storing: an order in which the two or more signatures were obtained; and an indication that the two or more signatures were obtained from the same mobile communication unit; and interpolating between any of the two or more signatures in a sequence, to create additional reference signatures.

22. A method of populating a database in accordance with claim 21, further comprising:
   storing, in the database, a timestamp for each of the two or more signatures; and
   wherein the measurement information comprising:
      control information;
      a set of cells, the set of cells being cells observable by the mobile communication unit; and
      received power level information, for signals received from the observable cells.

23. A method of populating a database in accordance with claim 22, wherein the control information for at least one signature comprises:
   timing advance data;
   burst throughput rate data;
   dynamic rate control information; and
   signal-to-noise ratio information.

24. A method of populating a database in accordance with claim 21,
   wherein the additional reference signatures are used to estimate a location of the mobile communication unit based on squared difference calculations using scaling and addition of squared differences.

25. A method of populating a database in accordance with claim 21, further comprising:
   obtaining test measurements from test mobile communication units deployed in the cellular wireless communications system, together with location information and timing information for each test measurement; and
   adding the test measurements, location information and timing information to the database, thereby creating additional reference signatures or an initial population of reference signatures.

* * * * *